US012078407B2

(12) United States Patent
Diederichs

(10) Patent No.: US 12,078,407 B2
(45) Date of Patent: Sep. 3, 2024

(54) DOOR FOR A FREEZER OR REFRIGERATOR CABINET

(71) Applicant: SCHOTT AG, Mainz (DE)

(72) Inventor: Jochen Diederichs, Mainz (DE)

(73) Assignee: SCHOTT AG, Mainz (DE)

(*) Notice: Subject to any disclaimer, the term of this patent is extended or adjusted under 35 U.S.C. 154(b) by 270 days.

(21) Appl. No.: 17/578,237

(22) Filed: Jan. 18, 2022

(65) Prior Publication Data

US 2022/0136759 A1 May 5, 2022

Related U.S. Application Data

(63) Continuation of application No. PCT/EP2020/057120, filed on Mar. 16, 2020.

(30) Foreign Application Priority Data

Jul. 17, 2019 (DE) .................... 10 2019 210 574.2

(51) Int. Cl.

| | |
|---|---|
| ***F25D 23/02*** | (2006.01) |
| ***A47F 3/04*** | (2006.01) |
| ***E06B 3/663*** | (2006.01) |

(52) U.S. Cl.

CPC .......... *F25D 23/028* (2013.01); *A47F 3/0434* (2013.01); *E06B 3/66328* (2013.01); *E06B 3/66361* (2013.01)

(58) Field of Classification Search

CPC ...... F25D 23/028; F25D 21/04; A47F 3/0434; E06B 3/66328; E06B 3/66361

See application file for complete search history.

(56) References Cited

U.S. PATENT DOCUMENTS

| | | | | |
|---|---|---|---|---|
| 1,913,703 | A | 6/1933 | D'Adrian | |
| 5,622,414 | A | 4/1997 | Artwohl | |
| 8,530,010 | B2 | 9/2013 | Lenhardt | |
| 10,039,390 | B2 * | 8/2018 | Artwohl | E06B 3/6612 |
| 10,443,300 | B2 * | 10/2019 | Kuster | A47F 3/005 |
| 11,609,038 | B2 * | 3/2023 | Kim | D06F 39/14 |

(Continued)

FOREIGN PATENT DOCUMENTS

| | | | | |
|---|---|---|---|---|
| CA | 3014922 A1 * | 9/2017 | | A47F 3/001 |
| CN | 207749051 U * | 8/2018 | | |

(Continued)

OTHER PUBLICATIONS

DIN EN ISO 23953-2, "Refrigerated display cabinets—Part 2: Classification, requirements and test conditions", Sep. 2012, 90 pages.

(Continued)

*Primary Examiner* — Hanh V Tran

(74) *Attorney, Agent, or Firm* — Ruggiero McAllister & McMahon LLC

(57) ABSTRACT

The disclosure relates to a door for a freezer or refrigerator cabinet, including an insulating glass unit with at least two panes, which are joined by means of spacers for the creation of a gas-filled intervening space. The panes each have a transparent region and all spacers are designed to be free of desiccant, and a desiccant reservoir, which is in fluidic connection with the intervening space between the at least two panes.

20 Claims, 7 Drawing Sheets

(56) References Cited

U.S. PATENT DOCUMENTS

| | | | | |
|---|---|---|---|---|
| 2004/0035086 | A1* | 2/2004 | Minaai | E06B 3/6617 52/786.13 |
| 2010/0279038 | A1* | 11/2010 | Wang | E06B 3/66357 428/156 |
| 2013/0139455 | A1 | 6/2013 | Miller | |
| 2014/0144083 | A1* | 5/2014 | Artwohl | G09F 23/065 49/70 |
| 2015/0151511 | A1 | 6/2015 | Weiss | |
| 2016/0120336 | A1 | 5/2016 | Schneider | |
| 2016/0174734 | A1* | 6/2016 | Artwohl | E06B 3/6612 428/34 |
| 2017/0328124 | A1* | 11/2017 | Abe | E06B 3/66304 |
| 2018/0164026 | A1* | 6/2018 | Lee | F25D 23/02 |
| 2019/0048651 | A1 | 2/2019 | Baquet | |
| 2019/0059613 | A1* | 2/2019 | Artwohl | F25D 23/028 |

FOREIGN PATENT DOCUMENTS

| | | | | |
|---|---|---|---|---|
| CN | 207904141 | U * | 9/2018 | |
| DE | 202014010734 | | 6/2016 | |
| EP | 0026577 | | 4/1981 | |
| EP | 0345211 | | 12/1989 | |
| EP | 2878233 | | 6/2015 | |
| EP | 3269688 | A1 * | 1/2018 | B28D 1/24 |
| WO | 0053062 | | 9/2000 | |
| WO | 2009103511 | | 8/2009 | |
| WO | WO-2016078593 | A1 * | 5/2016 | C03B 23/20 |
| WO | WO-2017056419 | A1 * | 4/2017 | B32B 17/10055 |
| WO | WO-2017174333 | A1 * | 10/2017 | A47F 3/005 |

OTHER PUBLICATIONS

English Translation of the Written Opinion of the International Searching Authority dated Jun. 18, 2020 for PCT/EP2020/057120, 4 pages.

English Translation of the International Preliminary Report on Patentability dated Jan. 18, 2022 for PCT/EP2020/057120, 5 pages.

English Translation of International Search Report dated Jun. 18, 2020 for PCT/EP2020/057120, 2 pages.

* cited by examiner

DOOR FOR A FREEZER OR REFRIGERATOR CABINET

CROSS-REFERENCE TO RELATED APPLICATION

The present application is a continuation under 35 U.S.C. § 120 of International Patent Application No. PCT/EP2020/057120, filed on Mar. 16, 2020, which in turn claims priority to German Patent Application No. 10 2019 210 574.2, filed on Jul. 17, 2019, each of which is incorporated herein by reference.

SUMMARY OF THE DISCLOSURE

1. Field of the Disclosure

The disclosure relates to a door for a freezer or refrigerator cabinet, comprising an insulating glass unit with at least two panes, which are joined with spacers for the creation of a gas-filled intervening space and wherein the panes each have a transparent region. The disclosure further relates to a freezer or refrigerator cabinet with a door.

Although the present disclosure is applicable, in general, to any doors for any cabinets, the present disclosure is described in regard to a refrigerator cabinet.

2. Discussion of the Related Art

Refrigerator cabinets serve for the refrigeration of products below the ambient temperature. Refrigerator cabinets such as refrigerator display cabinets in supermarkets can have a vertically aligned inner space with several shelves, in which products that are to be kept refrigerated are stored. Furthermore, the refrigerator display cabinets have transparent doors in order that a customer is able to see refrigerated products in the refrigerator display cabinet, without it being necessary for the customer to open each door when searching for a desired product. By means of the transparent door, therefore, a customer can then open specifically the respective door and remove the desired product from the refrigerator display cabinet in a simple and fast manner.

For thermal insulation, the doors can be provided with an insulating glass unit, which is composed of a plurality of panes that are arranged parallel to one another. An intervening space is formed here between every two panes by way of spacers peripherally arranged around the edge. A desiccant can be used in order to prevent any later fogging of the panes owing to moisture trapped in the intervening space during production of the insulating glass unit as well as owing to moisture that has penetrated into the intervening space. The desiccant can be introduced into a hollow-shaped spacer or even, for example, the spacer itself is made of a structural foam having an integrated desiccant. These spacers are not transparent and directly or indirectly obstruct the view of the products placed on the shelves, because the spacers are concealed by further profiled sections lying outside of the panes or by printing. In other words, the transparent faces of the panes are reduced in size by the spacers.

A drawback in this case is that, on the one hand, it is necessary to use differently designed spacers, thereby increasing the effort involved in assembly as well as increasing the costs for producing the respective refrigerator cabinet. Owing to the differently designed spacers, the probability of penetration of moisture is increased, in particular in the joining regions thereof in the corners of the panes. In addition to this, the transparent faces are reduced in size owing to the opaque spacers.

SUMMARY OF THE DISCLOSURE

An object of the present disclosure is therefore to make available a door as well as a refrigerator or freezer cabinet with a door that can be produced in a simple and cost-effective manner and has a high optical appearance, a long lifetime, and an adequate mechanical stability.

In one embodiment, the present disclosure provides a door for a freezer or refrigerator cabinet, comprising an insulating glass unit with at least two panes, which are joined with spacers for the creation of a gas-filled intervening space, wherein the panes each have a transparent region and wherein all spacers are designed to be free of desiccant, and a desiccant reservoir that is in fluidic connection with the intervening space between the at least two panes.

In another embodiment, the present disclosure provides a door for a freezer or refrigerator cabinet. The door comprises an insulating glass unit with a plurality of panes, wherein each of the panes has a transparent region. The door further comprises a plurality of spacers connected to the plurality of panes, so that the plurality of panes and the plurality of spacers define a gas-filled intervening space, and wherein each of the plurality of spacers is free of desiccant. The door further comprises a desiccant reservoir that is in fluidic connection with the intervening space, wherein at least one of the plurality of spacers is at least partially translucent.

The desiccant reservoir can be in the intervening space between the at least two panes and, for example, can be in fluidic connection with the remaining intervening space through apertures and/or the desiccant reservoir can be outside of the intervening space and be in fluidic connection with the intervening space via one channel or a plurality of channels.

One of the advantages thereby achieved is that the transparent face of the panes can be nearly fully exploited, because the spacers can be small or narrow in design, so that, in addition to a high optical appearance, the visibility of product is also improved owing to the respective door. Furthermore, a cost-effective and simple production is made possible. As a result of the desiccant-free spacer, the construction is likewise simplified and, in particular, an improvement in the gas tightness in the joining regions between two spacers is achieved. In addition to this, it is possible to arrange the desiccant reservoir in any region of the door, and the door or the refrigerator or freezer cabinet can be adapted in a simple way to different customer specifications.

The term "vertically" refers, in particular in the claims and preferably in the description, to a direction parallel to the direction of the force of gravity, that is, perpendicular from top to bottom or vice versa and, in particular, parallel to a plumb line.

The term "horizontal" refers, in particular in the claims and preferably in the description, to a direction perpendicular to the vertical direction. For example, a horizontal spacer is a spacer that is arranged on a horizontal side of the pane.

The term "transparent" refers, in particular in the claims and preferably in the description, to a region, area, face, or the like that is designed optically in such a way that a view of goods, products, or the like behind the region is not obstructed by one opaque element or a plurality of opaque elements, such as, for example, by reinforcement profile sections, desiccant reservoirs, frame profile sections, or the like. The definition of the term “transparent” or “transparency” in accordance with embodiments of the present disclosure can comprise the following definition: transparency of an element means that light can pass through the element without scattering, whereby preferably Snell’s law of refraction can be applied for the light path or the formation of images.

The term “transparent face” is understood here to refer to a two-dimensional region, which is designed at least in part and, in particular, predominantly to be transparent, but also can have translucent subregions.

The term “nontransparent” refers, in particular in the claims and preferably in the description, to a region, area, face, or the like that is designed optically in such a way that a view of goods, products, or the like behind the region is obstructed by one opaque element or a plurality of opaque elements, such as, for example, by reinforcement profile sections, desiccant reservoirs, frame profile sections, or the like.

The term “translucent” refers, in particular in the claims and preferably in the description, to a region, area, face, or the like that is optically designed in such a way that a view of goods, products, or the like behind the region is not obstructed by one opaque element or a plurality of opaque elements, but is diffuse, so that, for example, outlines of a product can be perceived, but no labeling can be perceived and whereby, in particular, this labeling is at least illegible. Transparent materials are, in particular, of clear appearance in a single color.

The term “at least” in regard to the term “translucent” means, in particular in the claims and preferably in the description, that, for example, the optical visibility of products behind an at least translucently designed element is translucent or greater or better; that is, the visibility lies between translucent and transparent or, in other words, the optical visibility of products behind an at least translucent element is increased. The expression “at least translucent” accordingly comprises the term “transparent.”

The term “freezer cabinet,” “freezer apparatus,” “freezer display cabinet,” or “deep-freeing cabinet” refers, in particular in the claims and preferably in the description, to a cabinet or apparatus in which the temperature of consumable items is usually kept in the range between −12° C. and −30° C. under normal conditions. Normal conditions are defined as operating conditions that prevail when all permanently present auxiliary elements are utilized or operated in accordance with the manufacturer’s recommendations or specifications. Typical examples of consumable items are, for example, products that are stored in the temperature classes L1, L2, and L3 in accordance with EN23953, Part 2 (September 2012).

The term “refrigerator cabinet,” “refrigerator apparatus,” or “refrigerator display cabinet” refers, in particular in the claims and preferably in the description, to a cabinet or apparatus in which the temperature of consumable items is usually kept in the range between −5° C. and +10° C. under normal conditions, preferably between 0° C. and +7° C. Typical examples of consumable items are, for example, products that are stored in the temperature classes M1 and M2 in accordance with EN23953, Part 2 (September 2012).

The term “gas-filled insulating glass unit,” in particular in regard to the term “gas-filled intervening space,” refers, in particular in the claims and preferably in the description, to a unit or device with at least two panes, such as, for example, 2 or 3 panes, which need not necessarily be made of glass and which are spaced apart with spacers for the creation of a sealed intervening space, in particular a hermetically sealed intervening space. In the sealed intervening space, in particular the hermetically sealed intervening space, air or an insulating gas or a mixture of air and an insulating gas is introduced. The panes can have a thickness of between 3 mm and 5 mm, in particular 4 mm, and/or they can have an antifogging coating and/or a heatable coating and/or a coating with a low degree of emission and/or an antireflection coating. The spacers can have a depth/thickness of between 4 mm and 20 mm.

Further features, advantages, and further embodiments of the disclosure are described below or will be disclosed thereby.

In accordance with an advantageous enhancement, at least one spacer is made to be at least partially translucent, in particular at least partly transparent, and preferably fully transparent in design. The utilizable transparent or translucent face of the panes is thereby further increased and the visibility of products through the door is improved.

In accordance with another advantageous enhancement, all spacers are designed to be at least partially translucent, in particular at least partly transparent, and preferably fully transparent.

In addition to an especially high appearance, an extremely large utilizable transparent or translucent face of the panes is made available.

In accordance with another advantageous enhancement, the desiccant reservoir is in an edge region, which is adjacent to one of the spacers. A simple arrangement and connection of the desiccant reservoir to the intervening space between the at least two panes is thereby made possible.

In accordance with another advantageous enhancement, the desiccant reservoir and an at least partially opaque element are within the transparent region in such a way that the desiccant reservoir is covered up at least partly and in particular fully by the opaque element. In this way, it is possible, for example, for the desiccant reservoir to be covered up by an element that is nontransparent or nontranslucent in design, so that the transparent or translucent face is not additionally reduced in size by the obstruction of view due to the desiccant reservoir.

In accordance with another advantageous enhancement, the at least partially opaque element is designed as at least one desiccant reservoir. The advantage of this is that one structural unit composed of the desiccant reservoir and the opaque element is provided, thereby simplifying the arrangement thereof on or in the door.

In accordance with another advantageous enhancement, all spacers are each identical in design. This simplifies the production and lowers the production costs for the door.

In accordance with another advantageous enhancement, the desiccant reservoir is outside of the region that is formed by the spacers and the transparent face. An especially simple accessibility to the desiccant reservoir is thereby ensured.

In accordance with another advantageous enhancement, the desiccant reservoir is in the bottom region of the door. One of the advantages thereby achieved is that a region of subsidiary visual importance for perception by the customer is thereby utilized for the arrangement of the desiccant reservoir. A further advantage is that moisture fundamentally falls to the bottom, so that moisture can be effectively taken up by the desiccant in the desiccant reservoir.

In accordance with another advantageous enhancement, the desiccant reservoir is designed to extend horizontally over the horizontal width of the insulating glass unit. It is thereby possible to provide an especially large desiccant reservoir and/or to provide a desiccant reservoir with a small vertical extension. In addition to this, moisture can be taken up effectively over the entire horizontal length of the door by the desiccant in the desiccant reservoir.

In accordance with another advantageous enhancement, the door comprises a plurality of desiccant reservoirs, which are preferably arranged symmetrically in relation to an axis of symmetry of the door. The flexibility of the arrangement of the desiccant is thereby appreciably increased and, at the same time, an enhanced optical appearance is achieved based on the symmetrical arrangement.

In accordance with another advantageous enhancement, the desiccant reservoirs are arranged symmetrically with respect to one another in relation to a horizontal axis of symmetry and, in particular, they have the same measurements in at least two dimensions. In addition to an enhanced optical appearance, a uniform arrangement of the desiccant in regard to the vertical extension is also achieved thereby. Accordingly, moisture can be taken up by the desiccant both in the upper and in the lower regions, thereby appreciably reducing the probability of fogging the panes of the door.

In accordance with another advantageous enhancement, a desiccant reservoir is in the region of a suspension mounting and/or a guide of the door. It is thereby possible in a simple way to utilize, for example, nontranslucent or nontransparent elements of the suspension mounting to cover up the desiccant reservoir, without having to additionally restrict the utilizable transparent face by at least one desiccant reservoir.

In accordance with another advantageous enhancement, the opaque element comprises a gripping unit for opening and closing the door. It is thereby possible in a simple way to utilize a conventionally present handle or the like in order to cover up the at least one desiccant reservoir. The utilizable transparent face is thereby not additionally restricted.

In accordance with another advantageous enhancement, the opaque element comprises a display device, in particular an imprinted or adhering decorative film or the like. It is thereby possible in a simple way to utilize the opaque element for the display of information, such as, for example, information for customers.

In accordance with another advantageous enhancement, a desiccant reservoir has an optical covering element for optically covering up the desiccant reservoir, in particular one that is designed to be reflecting and/or translucent. An especially high optical appearance is thereby achieved and the eye of a customer or the like is drawn away from the at least one desiccant reservoir.

In accordance with another advantageous enhancement, at least one desiccant reservoir is designed for exchanging the desiccant. It is thereby possible to increase flexibility as well as the service life. Thus, for example, it is possible in future to utilize a more effective desiccant in place of the previously used desiccant or also, the desiccant can be replaced after a certain period of time, thereby increasing the service life of the door.

In accordance with another advantageous enhancement, at least one desiccant reservoir is in the door in an exchangeable manner. This makes possible an especially fast and simple exchange of the desiccant. For example, it is possible to provide a customer with corresponding desiccant reservoirs, similar to toner cartridges for printers or the like, so that an operator of the door does not need to remove the old desiccant and place the new desiccant in the reservoir.

In accordance with another advantageous enhancement, the door is designed as a revolving door, a swinging door, a hinged door, or a sliding door. It is thereby possible to adapt the door in an extremely flexible way to the particular wishes of the customer.

Further important features and advantages of the disclosure ensue from the dependent claims, from the drawings, and from the associated figure descriptions based on the drawings.

It is understood that the above-mentioned features and the features that are still to be mentioned below can be used not only in the respectively given combinations, but also in other combinations or alone, without leaving the scope of the present disclosure.

Preferred designs and embodiments of the present disclosure are depicted in the drawings and are explained in detail in the following description, whereby identical reference numbers refer to identical or similar or functionally identical components or elements.

DETAILED DESCRIPTION OF THE DISCLOSURE

Figure 1:
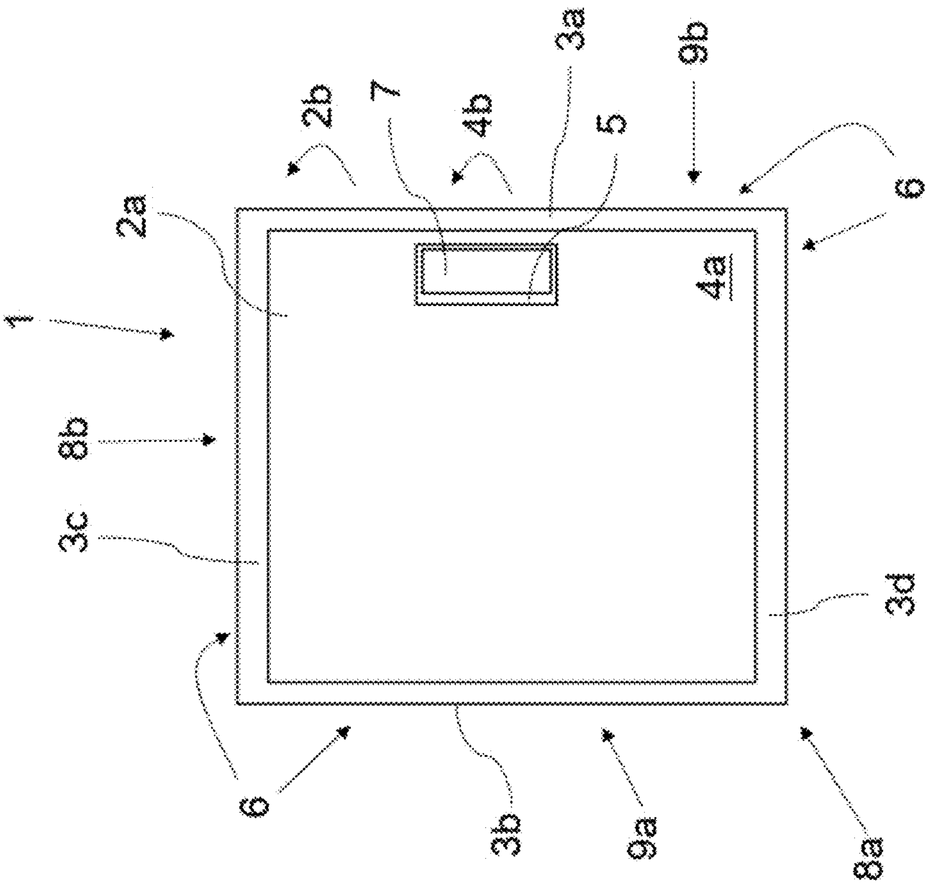
FIG. 1 shows a door in plan view in accordance with an embodiment of the present disclosure.

Shown in FIG. 1 in detail is a door 1 with a hermetically sealed insulating glass unit 2 as seen in a plan view of one of the two panes 2*a*, 2*b* of the insulating glass unit 2. The two panes 2*a*, 2*b* are joined with each other via vertical and horizontal spacers 3*a*-3*d* extending peripherally around the edge regions 6 of the panes 2*a*, 2*b* with formation of an intervening space. The spacers 3*a*-3*d* are transparent in design and, together with the pane 2*a*, form a transparent face 4*a*. Furthermore, a desiccant reservoir is within the transparent face 4*a* and is partly overlaid or covered up by a handle 7. In this case, "within" means within the face 4*a* and comprises both an arrangement within the intervening space as well as an arrangement outside of it, such as, for example, on the pane 2*a*. The desiccant reservoir 5 can also be designed itself as the handle 7. Depending on the particular design, the desiccant reservoir 5 is in fluidic contact with the intervening space between the two panes 2*a*, 2*b* of the door 1, for example, via holes (not shown) in the pane 2*a*.

Figure 2:
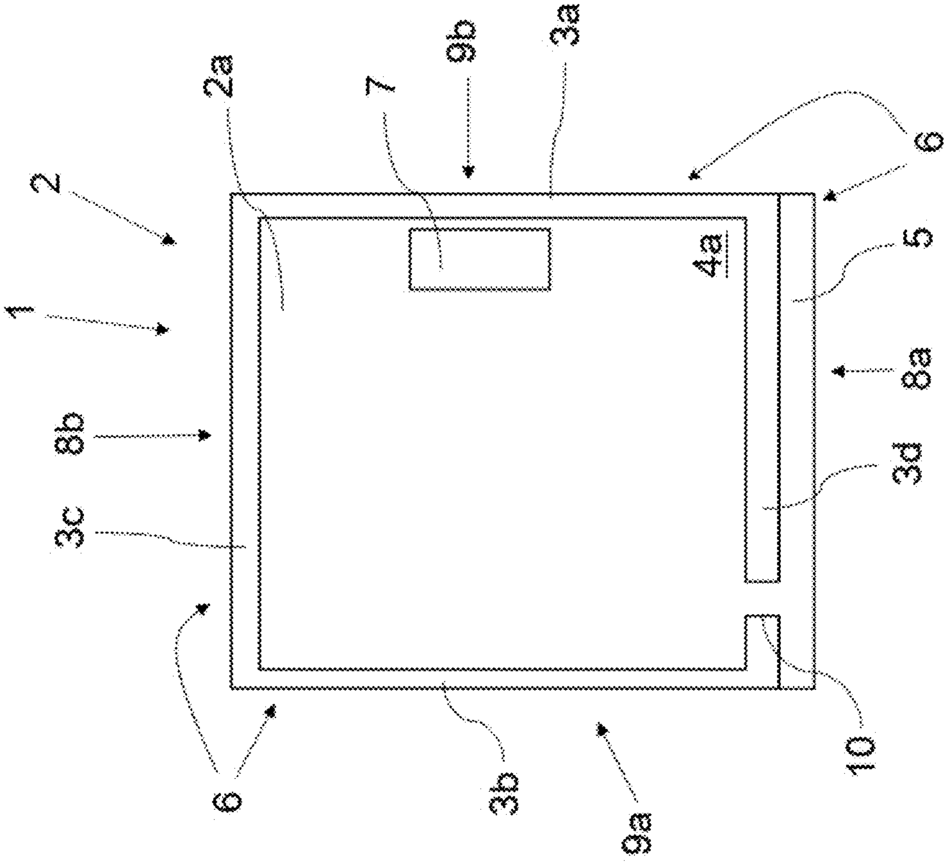
FIG. 2 shows a door in plan view in accordance with an embodiment of the present disclosure.

Shown in FIG. 2 is essentially a door 1 in accordance with FIG. 1. In contrast to the door 1 of FIG. 1, in the case of the door 1 of FIG. 2, the desiccant reservoir 5, instead of being within the face formed by the spacers 3*a*-3*d* peripherally around it, is now outside of the face in the bottom region 8*a* of the door 1. The desiccant reservoir 5 thereby extends along the entire horizontal length of the door 1. The desiccant reservoir 5 is thereby in fluidic connection with the intervening space between the two panes 2*a*, 2*b* via connection apertures or channels 10.

Figure 3:
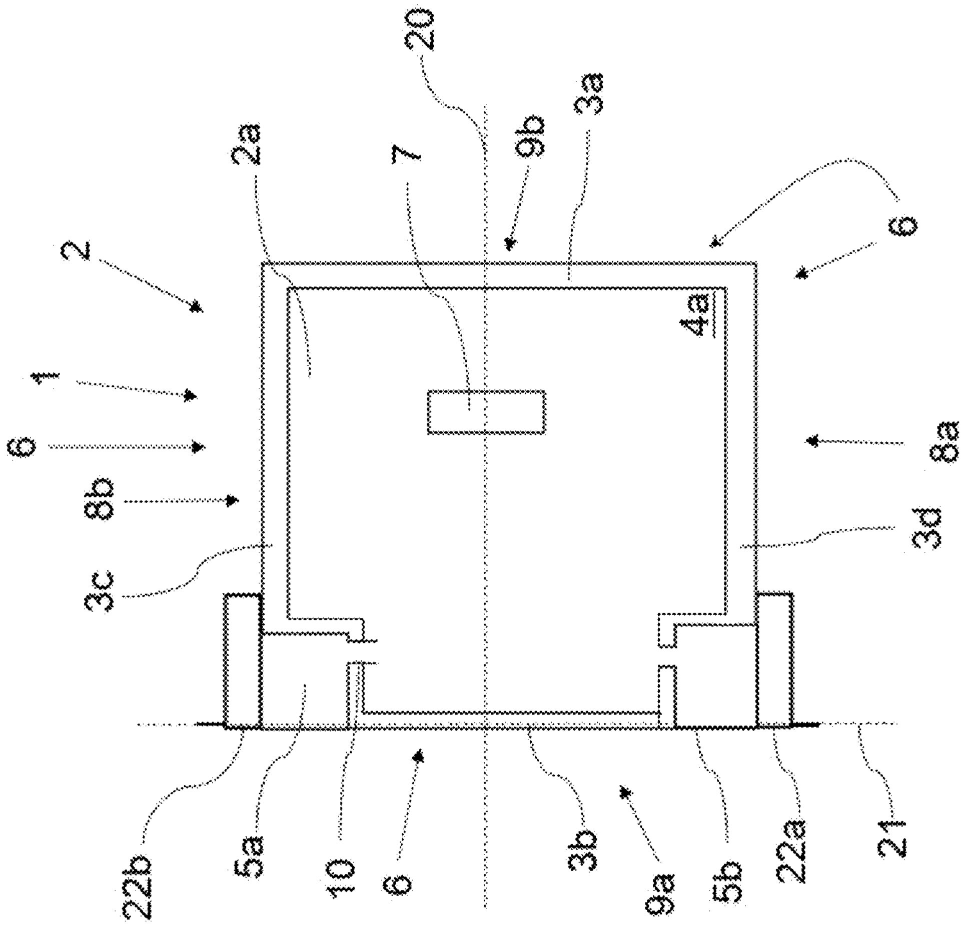
FIG. 3 shows a door in plan view in accordance with an embodiment of the present disclosure.

Shown in FIG. 3 is essentially a door 1 in accordance with FIG. 1. In contrast to the door of FIG. 1, in the case of the door 1 of FIG. 3, two desiccant reservoirs 5*a*, 5*b* are now outside of the face 4*a* formed by the peripherally arranged spacers 3*a*-3*d* and the panes 2*a*, 2*b*. They are situated on the top side 8*b* and the bottom side 8*a* on the left side of the door 1 in FIG. 3. In this case, the spacers 3*a*, 3*b*, 3*c*, 3*d* are designed correspondingly to extend peripherally around the respective desiccant reservoir 5. Arranged on the top side 8*b* and the bottom side 8*a*, likewise on the left side of the door 1 in FIG. 3, are respective suspension mountings 22*a*, 22*b*, which serve for revolving the door around an axis 21. Then, if the handle is pulled, the door 1 opens by revolving around the axis 21. In this case, the two desiccant reservoirs 5*a*, 5*b* are arranged symmetrically in relation to a horizontal axis 20, which, in this case, is an axis of symmetry of the door 1. Via corresponding apertures or connection channels 10 in the spacers 3*c*, 3*d*, the two desiccant reservoirs 5*a*, 5*b* are in fluidic connection with the intervening space between the two panes 2*a*, 2*b*.

Figure 4:
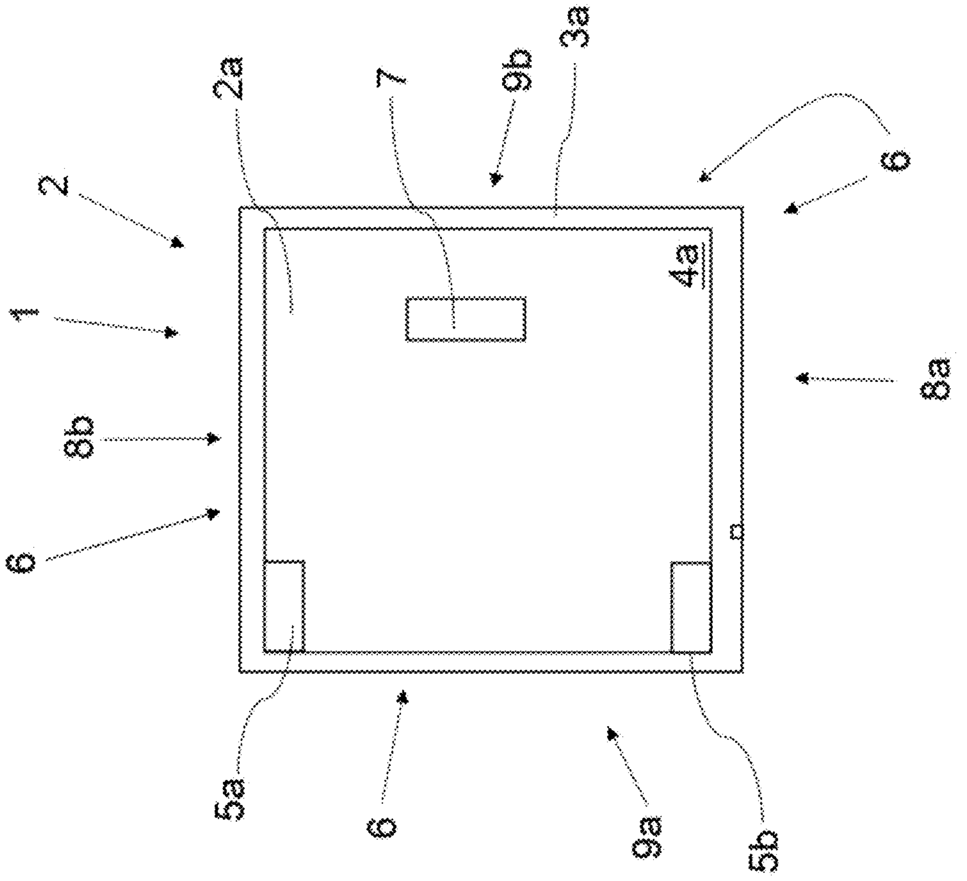
FIG. 4 shows a door in plan view in accordance with an embodiment of the present disclosure.

Shown in FIG. 4 is essentially a door 1 in accordance with FIG. 3. In contrast to the door 1 of FIG. 3, in the case of the door 1 of FIG. 4, the two desiccant reservoirs 5*a*, 5*b* are now within the face 4*a* formed by the panes 2*a*, 2*b* and the peripherally arranged spacers 3*a*-3*d*. For the sake of simplicity, the suspension mountings 22*a*, 22*b*, as also in the case of the other figures, are no longer depicted. It is conceivable in this case to arrange the desiccant reservoirs 5*a*, 5*b* within the intervening space between the two panes 2*a*, 2*b* as well as outside of the intervening space, such as, for example, on one of the panes 2*a*, but within the face bounded by the spacers 3*a*-3*d*.

Figure 5:
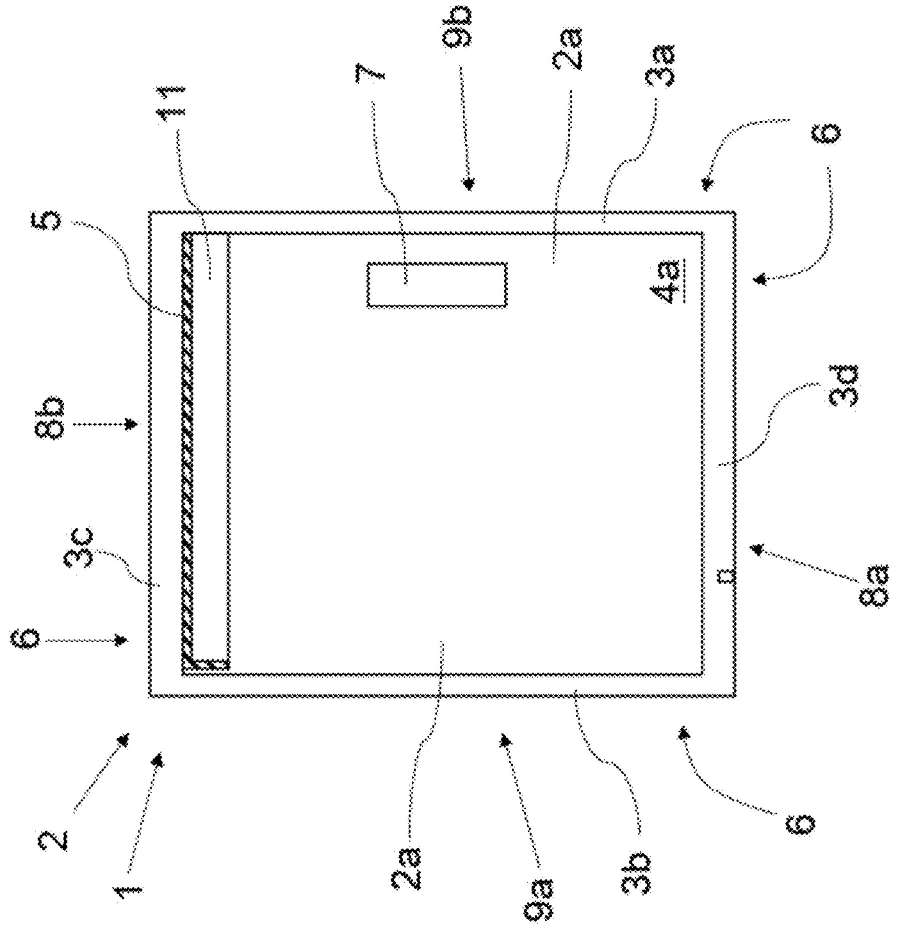
FIG. 5 shows a door in plan view in accordance with an embodiment of the present disclosure.

Shown in FIG. 5 is substantially a door 1 in accordance with FIG. 1. In contrast to the door 1 of FIG. 1, in the case of the door 1 of FIG. 5, the desiccant reservoir 5 is now within the face 4*a* formed by the panes 2*a*, 2*b* and the peripherally arranged spacers 3*a*-3*d*. Furthermore, the desiccant reservoir 5 is on the top side 8*b* of the door 1. Arranged on the surface of the desiccant reservoir 5 is a display device 11 in order to cover up the desiccant reservoir 5. The display device 11 can be, for example, an imprinted film or the like, which, for example, has names of groups of products or the like for customer information. For the sake of simplicity, the suspension mountings 22*a*, 22*b* are once again not depicted. Corresponding to the design of FIG. 2, the desiccant reservoir 5 extends horizontally over the entire horizontal width of the door 1 between the two vertical spacers 3*a*, 3*b*.

Figure 6:
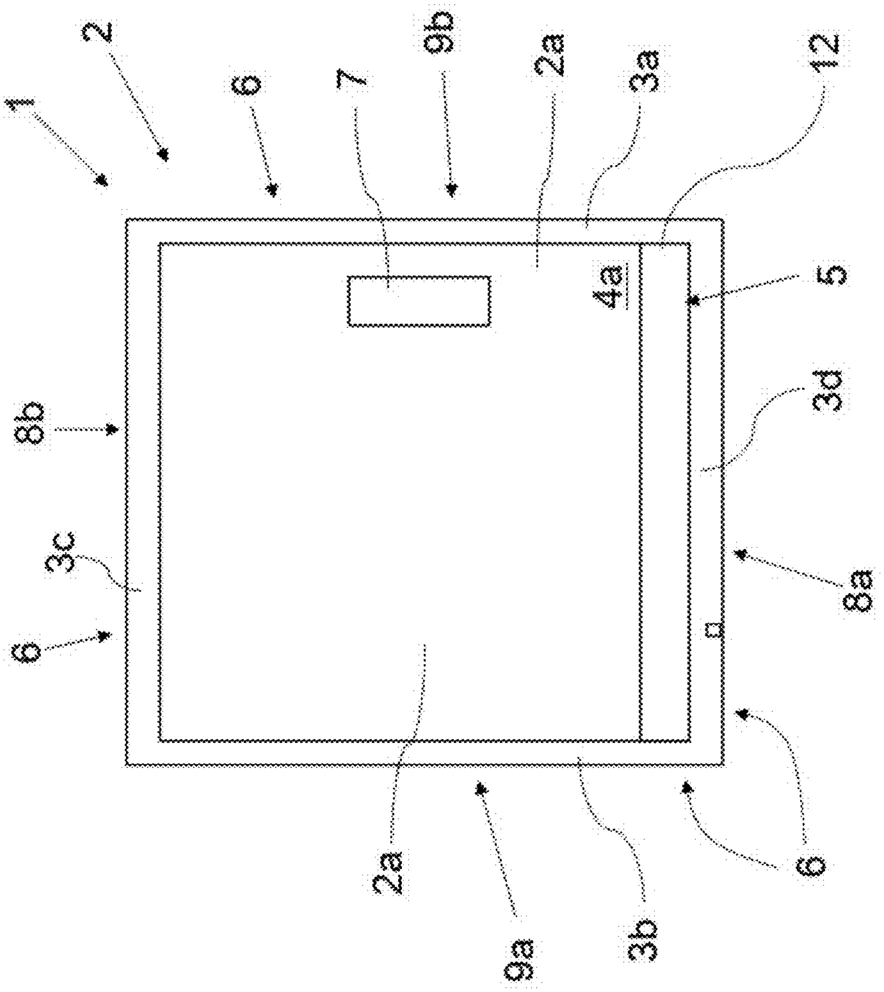
FIG. 6 shows a door in plan view in accordance with an embodiment of the present disclosure.
Figure 7:
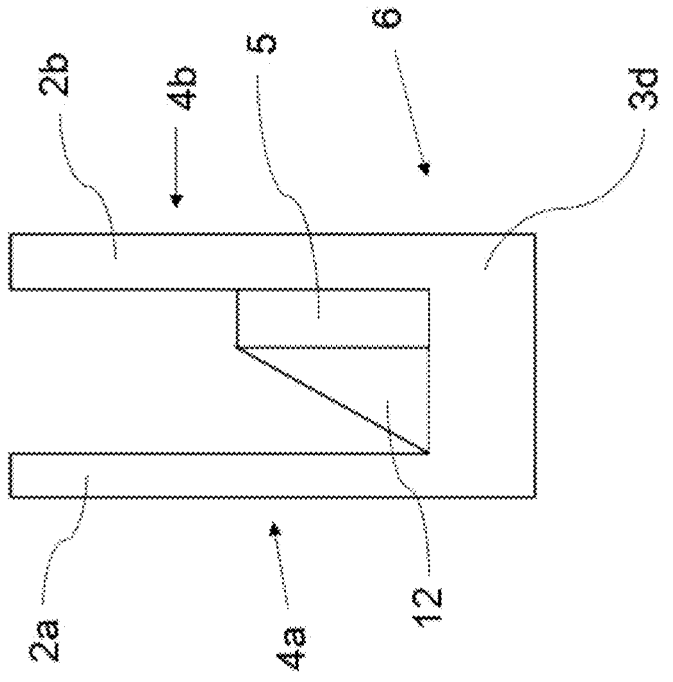
FIG. 7 shows an excerpt of a side view of the door in accordance with FIG. 6.

Shown in detail in FIGS. 6 and 7 is substantially a door 1 in accordance with FIG. 5. In contrast to the door 1 of FIG. 5, in the case of the door 1 of FIGS. 6 and 7, the desiccant reservoir 5 is now on the bottom side 8*a* of the door 1 between the two panes 2*a*, 2*b*. Arranged on the surface of the desiccant reservoir 5 is a reflecting or imprinted decorative surface that extends obliquely in order to cover up the view of the desiccant reservoir 5.

As desiccant, it is possible to use, for example, molecular sieves or a combination with silica gel. Corresponding crystals have a mean pore size of between 3 and 10 Angstroms.

As material for the panes, it is possible to use, for example, glass and/or plastic.

As material for the spacers, it is possible to use, for example, transparent adhesives, resins, or the like.

In summary, at least one of the embodiments of the disclosure has at least one of the following advantages:

long service life
high optical appearance
mechanical stability
the largest possible translucent or transparent faces
high flexibility
simple, cost-effective production
impermeability to moisture penetrating into the intervening space between the panes of the door Although the present disclosure has been described on the basis of preferred exemplary embodiments, it is not limited thereto, but can be modified in diverse ways.

LIST OF REFERENCE NUMBERS

1 door
2 insulating glass unit
2*a*, 2*b* pane
3*a*, 3*b*, 3*c*, 3*d* spacer
4*a*, 4*b* transparent face
5, 5*a*, 5*b* desiccant reservoir
6 edge region
7 handle
8*a* bottom side
8*b* top side
9 vertical side
10 connection apertures/channels
11 display device
12 decorative element
20 horizontal axis
21 axis
22*a*, 22*b* suspension mountings

What is claimed is:

1. A door for a freezer or refrigerator cabinet, comprising:
an insulating glass unit with a plurality of panes, wherein each of the panes has a transparent region;
a plurality of spacers connected to the plurality of panes so that the plurality of panes and the plurality of spacers define a gas-filled intervening space, wherein each of the plurality of spacers is free of desiccant; and
a desiccant reservoir that is in fluidic connection with the gas-filled intervening space,
wherein at least one of the plurality of spacers is at least partially translucent.

2. The door according to claim 1, wherein at least one of the spacers is fully transparent.

3. The door according to claim 1, wherein each of the plurality of spacers is fully transparent.

4. The door according to claim 1, wherein the desiccant reservoir is in an edge region of the door, and wherein the edge region is adjacent to one of the plurality of spacers.

5. The door according to claim 1, further comprising an at least partially opaque element, wherein the desiccant reservoir and the opaque element are within the transparent region, and wherein the desiccant reservoir is covered up at least partly by the opaque element.

6. The door according to claim 5, wherein the opaque element is a component of the desiccant reservoir.

7. The door according to claim 1, wherein each of the plurality of spacers are identical in design.

8. The door according to claim 1, wherein the desiccant reservoir is outside of a region that is formed by the plurality of spacers and the transparent regions of the panes.

9. The door according to claim 1, wherein the desiccant reservoir is in a bottom region of the door.

10. The door according to claim 9, wherein the desiccant reservoir extends horizontally over a horizontal width of the insulating glass unit.

11. The door according to claim 1, wherein the door comprises a plurality of desiccant reservoirs.

12. The door according to claim 11, wherein the plurality of desiccant reservoirs are located symmetrically to one another in relation to a horizontal axis of symmetry of the door.

13. The door according to claim 12, wherein each of the plurality of desiccant reservoirs have the same measurements in at least two dimensions.

14. The door according to claim 1, wherein the desiccant reservoir is in the region of a suspension mounting and/or a guide of the door.

15. The door according to claim 5, wherein the opaque element comprises a gripping unit for opening and closing the door, and/or wherein the opaque element comprises a display device.

16. The door according to claim 1, wherein the desiccant reservoir has an optical covering element for optically covering up the desiccant reservoir.

17. The door according to claim 16, wherein the optical covering element is reflective and/or translucent.

18. The door according to claim 1, wherein the desiccant reservoir allows for an exchange of a desiccant therein.

19. The door according to claim 1, wherein the desiccant reservoir is exchangeably connected to the door, and/or wherein the door is a revolving door, a swinging door, a hinged door, or a sliding door.

20. A freezer or refrigerator cabinet comprising the door according to claim 1.

* * * * *